④ United States Patent [19]
McCoy et al.
[11] 3,870,765
[45] Mar. 11, 1975

[54] ALKYLATION AIDS

[75] Inventors: Frederic C. McCoy, Beacon; Edward L. Cole, Fishkill, both of N.Y.

[73] Assignee: Texaco Inc., New York, N.Y.

[22] Filed: June 14, 1973

[21] Appl. No.: 370,195

[52] U.S. Cl. ........ 260/683.51, 252/428, 260/683.63
[51] Int. Cl. ........ C07c 3/54
[58] Field of Search ....... 260/683.51, 683.63, 671 C

[56] References Cited

UNITED STATES PATENTS

| | | | |
|---|---|---|---|
| 2,276,251 | 3/1942 | Morrell | 260/683.63 |
| 2,384,294 | 9/1945 | Frey | 260/683.51 |
| 2,416,013 | 2/1947 | Matuszak | 260/683.51 |
| 2,423,401 | 7/1947 | O'Kelly et al. | 260/683.63 |
| 3,251,895 | 5/1966 | Wilkes | 260/668 |
| 3,795,712 | 3/1974 | Torck et al. | 260/671 C |

*Primary Examiner*—Paul M. Coughlan, Jr.
*Attorney, Agent, or Firm*—T. H. Whaley; C. G. Ries

[57] ABSTRACT

Alkylation processes catalyzed by liquid strong acid catalysts wherein an alkylatable hydrocarbon is alkylated with an alkylating agent. Hydrocarbon solutions of alkylation aids prepared using alkylphenol solubilizing agents are employed to improve alkylate quality and reduce acid consumption in such alkylation processes.

7 Claims, No Drawings

ALKYLATION AIDS

This application is related to application Ser. No. 359,941, filed May 14, 1973, U.S. Pat. No. 3,829,525, which is incorporated herein in its entirety for all purposes.

BACKGROUND OF THE INVENTION

The present invention relates to an improved strong acid-catalyzed alkylation process. In particular, it relates to an alkylation process carried out in the presence of alkylation aids effective for improving the quality of alkylate hydrocarbon produced and for decreasing consumption of acid catalyst.

Alkylation processes for reaction of alkylatable hydrocarbons with alkylation agents are well known and practiced widely upon a commercial basis. Commonly, an alkylatable hydrocarbon such as an isoparaffin or aromatic is reacted in the liquid phase with an olefin hydrocarbon in the presence of a heterogeneous, liquid-phase strong acid catalyst. Of particular commercial importance is the alkylation of low boiling isoparaffin hydrocarbons such as isobutane, isopentane, isohexane, etc., with low boiling olefin hydrocarbons such as propylene, butylenes, and isobutylenes, etc., to form high octane alkylate hydrocarbons suitable for use as gasoline blend stocks. The reactants may not be normally liquid, consequently, super-atmospheric pressures are commonly employed to maintain reactants in the liquid phase. Reaction temperatures are preferably in the range of about −20°C to 65°C. Strong acid catalysts, such as $H_2SO_4$, HF, $HSO_3F$, and the systems $H_2SO_4$-$SO_3$, $H_2SO_4$-$HSO_3F$, $H_2SO_4$ $HSO_3Cl$, and $H_2SO_4$-$HB(HSO_4)_4$ are commonly employed and are brought into intimate contact with reactants by agitation or other mixing means. Under such reaction conditions, olefin hydrocarbons tend to react together forming polymer compounds as well as reacting with isoparaffin hydrocarbons to form the desired 1:1 isoparaffin-olefin reaction product. Such olefin polymer by-products also tend to crack in the presence of the strong acid catalyst thus forming undesirable low octane light alkylate as well as the equally undesirable high molecular weight heavy alkylate compounds. Additionally, olefin polymers are difficult to separate from the strong acid catalyst and form acid-oil sludges therein. The presence of such acid-oil sludges as well as water in the strong acid catalyst decreases the strength of the strong acid catalyst. Such acid catalyst strength contributes to an increase in undesirable side reactions, such as olefin polymerization as well as decreasing the effectiveness of the acid catalyst for alkylation of isoparaffin with olefins. Desirably, the alkylate product comprises a major portion of the highly branched isomers of the 1:1 isoparaffin-olefin reaction product. For example, in the alkylation of isobutane with butene, trimethylpentanes are the desired product, and in the alkylation of isobutane with propylene, dimethylpentanes are the desired product. Low catalyst acidity due to the presence of the acid-oil sludges and water contributes to production of less highly branched alkylate isomers which have lower octane values than more highly branched isomers, and consequently are of less value in gasoline blending. Aditionally, cracked olefin polymers contribute substantial amounts of undesirable light and heavy alkylate compounds which have substantially lower octane values than the highly branched 1:1 isoparaffinolefin reaction product.

It is known that certain compounds, herein referred to as alkylation aids, may be employed in admixture with the acid catalyst in an alkylation process to improve the production of highly branched 1:1 isoparaffin-olefin adducts at the expense of olefin polymers and the resulting light and heavy alkylate compounds. Also, the use of such alkylation aids decreases the consumption of acid catalyst in an alkylation process. For example, reference may be made to the following U.S. patents which describe a variety of surface active compounds which may be used in alkylation processes described herein. Reference U.S. Pat. Nos. are: 2,880,255; 3,661,514; 2,981,772; 3,231,633; 3,364,280; and 3,324,196. Such surface active agents, disclosed in the preceding patents, are effective for reducing the surface tension of the strong acid catalyst thereby improving contact of the catalyst with reactant hydrocarbons. It is also postulated that perhaps these surface active agents may serve to increase solubility of reactant hydrocarbons within the liquid catalyst phase. As a consequence, such surface active agents must be used with care since relatively small amounts of such surface active agents tend to create stable emulsions of reactant hydrocarbon and acid catalyst under the conditions of agitation and mixing commonly employed in commercial alkylation reactions. Such hydrocarbon-acid emulsions may be difficult to break, thus complicating separation of acid catalyst from hydrocarbon effluent of an alkylation process. Consequently, surface active alkylation aids are generally employed at concentrations less than two percent by weight of the acid catalyst, and preferably within the ranges of about 0.0005–1.0 percent, such that stable hydrocarbon acid emulsions do not form. Surface active compounds which have been found effective as alkylation aids include primary amines having 12 to 24 carbon atoms in the alkyl radical; ammonium salts such as $C_{12\text{-}24}NH_3Cl$, $C_{12\text{-}24}N(CH_3)_3Br$, $C_{12\text{-}24}(C_5H_5)NCl$, etc.; phosphonium salts having at least one aliphatic radical of 12 to 20 carbon atoms; and sulfonium salts having at least one aliphatic radical of 12 to 20 carbon atoms. These surface active compounds are generally soluble in strong acids, such as are used as alkylation catalyst and are only slightly soluble, e.g., generally less than 1.0 percent, in hydrocarbons within the gasoline boiling range.

In addition to the above surface active compounds, we have discovered particular sulfonamides which are effective alkylation aids. These compounds and their uses are more fully described in copending application Ser. No. 359,941, filed May 14, 1973 which is incorporated herein in its entirety. These particular sulfonamides have the general formula:

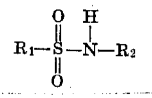

wherein $R_1$ is selected from alkyl, aromatic, and alkyl aromatic and wherein $R_2$ is alkyl of from 8 to 30 carbon atoms. The sulfonamide alkylation aids have properties such that, when added to an alkylation reaction mixture, increased yields of high quality products and lower consumption of alkylation catalyst are experienced.

The prior art teaches that in alkylation reactions wherein the reactants form a heterogeneous liquid phase with a liquid alkylation catalyst, the amount of common surface presented by the two phases contributes to determination of the alkylation reaction rate and quality of products formed in the reaction. Consequently, it is common practice for increasing the surface area, to subject an alkylation reaction mixture to severe agitation to form an emulsion. It is also taught in the prior art to employ surface active agents for decreasing the surface tension between reactant phase and catalyst phase such the emulsions with increased surface may be developed. However, compounds closely related to compounds of the present invention and which have surface active properties, such as N, N' - (di-2-ethylhexyl) benzene sulfonamide, do not improve alkylation reactions in the manner of the compounds of the present invention.

Sulfonamide compounds useful as promoters of alkylation reactions are sulfonamides having a relatively long chain alkyl radical attached to the nitrogen of the sulfonamide. Such alkyl radicals may have from 8 to 30 carbon atoms and may be either straight or branched chain. Preferably, the alkyl radical is from 10 to 18 carbon atoms in length and particularly preferred in a straight chain alkyl radical of 18 carbon atoms (the octadecyl radical). In addition to the alkyl radical attached to the nitrogen, a hydrocarbon radical is also attached to the sulfur atom. Such hydrocarbon radicals may comprise alkyl, aromatic, or alkyl-aromatic. Hydrocarbon radicals of from about 1 to 7 carbon atoms are preferred with the methyl, phenyl, and tolyl radicals being particularly preferred. The phenyl radical is of highest preference as the hydrocarbon radical attached to the sulfur atom. Such sulfonamide compounds may be used as pure compounds or as mixtures of such compounds for achieving the beneficial effects of increased yields, higher quality products, and lower alkylation catalyst consumption. Sulfonamide compounds which are particularly useful include N-(octadecyl) benzene sulfonamide, N-(octadecyl) toluene sulfonamide, N-(octadecyl) methane sulfonamide, N-($C_{10}$-$C_{14}$ alkyl) benzene sulfonamide, and N-($C_{14}$-$C_{15}$ alkyl) benzene sulfonamide. The amount of sulfonamide compounds employed in an alkylation reaction may be varied from about 0.0005 to about 0.5 weight percent of the acid catalyst phase employed. At concentrations below about 0.0005, the benefits obtained from such sulfonamides are not substantial. At concentrations above about 0.5 weight percent, surface active characteristics of the sulfonamides become prevalent and emulsions of hydrocarbon reactant and catalyst phase may become difficult to separate. Sulfonamide compounds as disclosed herein are solids which are soluble in strong acids such as are employed as alkylation catalyst and only slightly soluble in hydrocarbons boiling within the gasoline range.

Such materials, as described herein above, which function as alklylation aids have limited solubility in hydrocarbons at ambient temperatures, e.g., generally less than 1.0 percent, and are generally solids or powders at room temperature. Only minor quantities of these alkylation aids are necessary for enhancing an alkylation reaction. Consequently, metering the alkylation aids into the alkylation reaction presents severe mechanical problems. Metering of a solid, even in powder form, into an alkylation system operating at superatmsopheric pressure is difficult and accurate metering of the very small quantities required of these alkylation aids is very difficult. Expensive equipment with high maintenance costs and rather low reliability is required to meter such solids.

Preferably, liquid solutions containing from about 5 to 15 percent of the alkylation aids described herein are employed. Such liquid solutions are easily handled with commonly available metering devices such as metering pumps, control valves and orifice flow meters, etc. Liquid solutions containing 5 to 15 percent alkylation aid are utilized in convenient volumes for metering into commercial alkylation systems. The volume of liquid solution required is not so large as to present storage problem or have any substantial dilution effect in the alkylation reaction, and yet is large enough to be accurately metered with commonly available commercial metering equipment.

Since the alkylation aids disclosed herein are only slightly soluble in hydrocarbons, as previously noted, if it is desired to add them to the catalyst as hydrocarbon solutions, substantial volumes are required, which presents storage problems. Also, if the hydrocarbon solvent is different from the alkylate hydrocarbon product, substantial dilution of the alkylate product may result. The alkylation aids are soluble in the strong acids utilized as catalyst in alkylation processes and can be employed as solutions in these acids. However, the acid solutions of alkylation aids are extremely corrosive. Special metering equipment immune to corrosive attack by strong acids is required when such acid solutions are employed. Additionally, substantial safety hazards are presented for personnel who must handle such strong acid solutions.

From U.S. Pat. No. 3,681,348, patened Aug. 1, 1972, it is known that certain nitrogen-containing pesticidal compounds may be made oil-soluble by utilizing certain alkyl phenol solubilizing agents. Such pesticidal compounds have at least one non-basic nitrogen-containing functional group. The pesticidal compounds disclosed do not include sulfonamides or closely related compounds.

SUMMARY OF THE INVENTION

Now, according to the present invention, we have discovered that liquid solutions containing from about 5 to 15 percent alkylation aid, about 5 to 45 percent alkyl phenol solubilizing agent and about 40 to 90 percent hydrocarbon solvent are effective for improving alkylate quality and reducing acid consumption in strong acid-catalyzed alkylation reactions. Preferably the liquid solutions of the present invention are employed in amounts sufficient to maintain the concentration of alkylation aid in the acid catalyst at from 0.0005 to about 0.5 percent by weight. By employing such liquid solutions, an alkylation aid may be metered into an alkylation system accurately, employing conventional metering equipment such as metering pumps, control valves and flow meters, etc. The liquid solutions disclosed herein are substantially noncorrosive and are of reduced safety hazard compared to strong acid solutions containing an alkylation aid. As these liquid solutions are substantially more concentrated in alkylation aid than hydrocarbon solutions, storage space is minimized and no substantial dilution effect of the alkylate hydrocarbon is noted. The alkyl phenol solubilizing agents employed in compounding the liquid solutions of the present invention are not reactive with the alkylation aids and are not deleterious to an alkylation reaction. These and other advantages of the present invention will be discussed in the detailed description of the invention which follows.

DETAILED DESCRIPTION OF THE INVENTION

The present invention is applicable to alkylation reactions, that is reaction of an alkylatable hydrocarbon with an alkylation agent. Alkylatable hydrocarbons include isoparaffin hydrocarbons, aromatic hydrocarbons, etc. Alkylating agents include compounds such as olefins, alcohols, alkyl esters, ethers, alkyl sulfates, and others capable of contributing an alkyl radical to form a 1:1 reaction product with an alkylatable hydrocarbon under alkylation reaction conditions. Particularly, the present invention is applicable to those alkylation reactions wherein relatively low molecular weight alkylatable hydrocarbons are reacted with alkylating agents to form alkylate hydrocarbons boiling in the gasoline range. More particularly, the present invention is applicable to alkylation of isoparaffin hydrocarbons of from 4 to 6 carbon atoms, and preferably isobutane, with olefin hydrocarbons of from 3 to 5 carbon atoms, preferably propylene, butylenes, or mixtures thereof.

Olefin hydrocarbons are highly reactive under alkylation conditions and sufficient alkylatable hydrocarbon is provided to react with essentially all the olefins present. Preferably, a substantial excess of alkylatable hydrocarbons is provided to ensure more complete reaction of olefins with the alkylatable hydrocarbons. Molar ratios of isoparaffin to olefin may range from about 1/1 to about 50/1, and molar ratios of about 5/1 to about 20/1 are preferred. In such alkylation processes, reactants are maintained in the liquid phase. Reactants are not necessarily normally liquid, and superatmospheric reaction pressures are employed to maintain such liquid phase. Reaction pressures of from about 10 to 150 psig are preferred, although higher and lower pressures may be used without adverse effect so long as reactants remain in the liquid phase.

Catalysts for alkylation reactions include strong acids such as HF, $H_2SO_4$, $HSO_3F$, mixtures such as $H_2SO_4$-$SO_3$, $H_2SO_4$-$HSO_3F$, $H_2SO_4$-$HSO_3Cl$, $H_2SO_4$-$HB(HSO_4)_4$ and other strong Bronsted and Lewis acids. Acid catalysts which form heterogeneous liquid phase in the presence of liquid reactants are contemplated in the present invention. While various acid catalysts can be used, strong acid catalysts comprising about 88–98 weight percent $H_2SO_4$ are particularly preferred. When such a sulfuric acid catalyst is used, reaction temperatures may range from below −20°C to about 65°C. At lower temperatures, reaction rates are slower including side reaction rates which contribute undesirable side products, and at higher temperatures reaction rates increase, particularly the undesirable self-polymerization of olefins. Preferred reaction temperatures for alylation reactions of isoparaffins with olefins in the presence of sulfuric acid catalyst are in the range of −20°C to 35°C and especially preferred are temperatures in the range of −5°C to 25°C.

Olefins hydrocarbons, in the presence of acid catalysts, tend to self-polymerize into relatively high molecular weight polymers. The polymers then tend to crack into lower molecular weight hydrocarbons. The polymers and cracked hydrocarbons represent lost yield of desired alkylate product. Also in isoparaffin-olefin alkylation reactions for production of high octane alkylate, olefin polymers and cracked hydrocarbons are particularly undesirable as they are of low octane value and possess a substantial degree of unsaturation. Olefin polymers are difficult to separate from liquid strong acid alkylation catalyst, thus contributing to a decrease in acid strength of such catalyst. Decreased acid strength adversely effects the alkylation reaction, lowering the alkylation reaction rate and increasing formation of less desirable alkylate isomers. Also, reactions occur with the acid to form acid-oils. Consequently, acid is consumed in alkylation reactions in which polymerization and cracking occur as side reactions. In commercial practice, a portion of used catalyst is withdrawn from the alkylation system and replaced with fresh concentrated acid in order to maintain the alkylation catalyst at a selected acid concentration. The withdrawn acid, known as spent acid, must then be regenerated or disposed of at considerable expense.

Commonly, commercial alkylation processes are continuous flow operations, although batch operations may also be performed. In a continuous flow process, reactant hydrocarbons and acid catalyst are contacted with agitation in a reaction zone. Reaction zone effluent is separated into a hydrocarbon phase and an acid phase with a portion of the separated acid phase being recycled for contact with additional reactants. If desired, a plurality of alkylation zones may be arranged to receive serial flow of acid phase and/or reactant phase. The isoparaffin is preferably present in substantial excess to olefin reactant, and an isoparaffin stream may be introduced into an alkylation reaction zone for contact with the acid catalyst. The olefin may then be introduced as a liquid or as a gas, and may enter the reaction zone with the isoparaffin, the acid, or may be introduced separately into the reaction mixture present in the reaction zone. The reaction effluent hydrocarbon phase comprises isoparaffin hydrocarbon and contains a substantial amount of alkylate hydrocarbon product. The alkylate hydrocarbon is separated from the isoparaffin in an alkylate recovery section, which may comprise one or more fractional distillation zones and/or other separation means. Preferably, in a commercial process, isoparaffin hydrocarbon separated from the reaction effluent is recycled as reactant to an alkylation reaction zone.

The use of the alkylation aids discussed herein above, particularly the sulfonamide alkylation aids, improves yield and quality of product alkylate. The alkylation reaction is promoted, thus additional amounts of 1:1 isoparaffin-olefin product are produced and, concomitantly, less olefin polymer and resulting cracked products are produced. Additionally, the formation of highly branched alkylate hydrocarbons is favored over their less highly branched isomers. In production of gasoline range alkylate, the highly branched isomers are preferred since octane number increases with increased branching. With the reduction in polymer and cracked hydrocarbon formation, acid consumption is also substantially decreased.

According to the present invention the alkylation aids are added to alkylation reactions in the form of liquid solutions in hydrocarbons. As the alkylation aids contemplated herein are substantially insoluble in hydrocarbons at normal ambient temperatures selected alkyl phenol solution aids are employed to produce liquid solutions containing from about 5 to 15 percent alkylation aid, which are resistant to crystal separation on standing over a temperature range encompassing normal ambient temperatures. Without such alkyl phenol solution aids, hydrocarbon solutions containing commercially practical concentrations of the alkylation aids disclosed herein cannot be made at normal ambient temperatures. It is unexpected that certain selected alkyl phenols serve as solution aids for such compounds as amines, ammonium salts, phosphonium salts and sulfonium salts which do not contain nonbasic nitrogen atoms. Additionally, since the phenolic hydroxyl is a reactive moiety, it is unexpected that a solution containing alkylation aids and alkyl phenols would retain properties which serve to enhance an alkylation reaction.

Alkylation aids contemplated in the present invention are generally solid and have a low solubility in hydrocarbons boiling in the gasoline range of from about 25°C to about 220°C. These alkylation aids include surface active compounds such as primary aliphatic amines having 12 to 24 carbon atoms, in the alkyl radical; ammonium salts such as $C_{12\text{-}24}NH_3Cl$, $C_{12\text{-}24}N(CH_3)_3Br$, $C_{12\text{-}24}(C_3\text{-}H_5)NCl$, etc.; phosphonium salts having at least one aliphatic radical of 12 to 20 carbon atoms; and sulfonium salts having at least one aliphatic radical of 12 to 20 carbon atoms. Also useful in the present invention are alkylation aids having the formula:

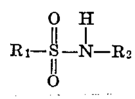

Wherein $R_1$ is selected from alkyl, aromatic, and alkyl aromatic, and wherein $R_2$ is alkyl of from 8 to 30 carbon atoms.

As stated above, the alkylation aids contemplated herein are insoluble or only slightly soluble in hydrocarbon solvents at normal room temperatures. We have discovered that solutions having concentrations of alkylation aids of about 5 percent to 15 percent in gasoline boiling range hydrocarbon solvents can be prepared employing selected alkyl phenol solubilizing agents, wherein such solutions do not show separation of the alkylation aids over a temperature range encompassing normal ambient temperatures. The alkyl phenols which are effective solubilizing agents include mono- and di-nuclear aromatics having at least one phenolic hydroxyl group and at least one aliphatic side chain of from 6 to 50 carbon atoms. Preferred alkyl phenol solubilizing agents are mono-nuclear phenols having a single branched aliphatic side chain of 9 to 15 carbon atoms. The proportions of alkyl phenol to alkylation aid are in the range of about 1:1 to about 10:1, and such proportion is selected to provide a solution of alkylation aid in hydrocarbon solvent having temperature stability over a selected range near normal ambient temperatures. Solutions having low viscosity which are easily pumpable and which can be accurately metered, comprise from about 40 percent to about 90 percent hydrocarbon solvent. Such hydrocarbon solvents boil generally within the gasoline boiling range. Preferred solvents include: cycloalkanes, particularly cyclohexane; alkyl substituted cycloalkanes, particularly methyl-cyclohexane; and polycycloalkanes, particularly decalin. Paraffins, particularly $C_6$-$C_{10}$ aliphatics, mixtures thereof, and gasoline fractions such as alkylate product of an alkylation reaction are also useful. Low boiling aromatics such as benzene and toluene can be employed but are not favored since they are subjected to alkylation in the alkylation reaction.

Alkylation aids contemplated for use in the present invention are useful to enhance alkylate quality and reduce acid consumption in alkylation reactions at concentrations of from about 0.0005 percent to about 1.0 percent, based on weight of acid catalyst. In this regard, we have found that amounts of hydrocarbon solutions which provide equivalent concentrations of alkylation aids are also useful in strong acid catalyzed alkylation reactions. Thus, such hydrocarbon solutions of alkylation aids are employed in amounts of from about 0.0033 percent to about 20 percent by weight of the acid catalyst in an alkylation reaction, in order to provide the desired concentration of alkylation aid.

In order to clearly demonstrate the advantages of the disclosed hydrocarbon solutions of alkylation aids in strong acid-catalyzed alkylation reactions, the following examples are included. These examples, disclosing specific embodiments of the present invention are included for the purpose of demonstrating the invention. These examples are not presented in a limiting sense and are not intended to restrict the scope of the invention.

Temperature-stable solutions of alkylation aids in hydrocarbon solvents were prepared utilizing alkyl phenol solubilizing agents. The preparation of these solutions is described in Examples I through X following.

EXAMPLE I

N-(octadecyl) benzene sulfonamide (1gm), nonyl phenol (2 gm) and cyclohexane (10 gm) were heated to 50°C with stirring until a clear solution resulted. Upon cooling to 25°C no crystals were observed after 6 hours standing. No crystals were observed upon cooling to 14°C.

EXAMPLE II

N-(octadecyl) benzene sulfonamide (1gm) nonyl phenol (7 gm) and dehexanized raffinate gasoline (7 gm) were heated to 50°C until a clear solution resulted. The solution remained clear and free of crystals at 13°C. Some crystals were seen after the solution stood for 1½ hour at 1°C.

EXAMPLE III

N-(octadecyl) methane sulfonamide (1 gm), nonyl phenol (3 gm) and toluene (6gm) were heated at 50°C until a clear solution resulted. After standing for 16 hours at 22°C appreciable crystal formation was noted in the solution. No crystals were formed in the solution upon standing at 40°C for 48 hours.

EXAMPLE IV

N-(octadecyl) p-toluene sulfonamide (1gm), nonyl phenol (3 gm) and cyclohexane (6 gm) were heated at 50°C until a clear solution resulted. Upon standing 16 hours at 22°C, some crystal formation was noted. Upon standing at 40°C no crystal formations occurred in the solution.

EXAMPLE V

N-(octadecyl) benzene sulfonamide (2gm), $C_{12}$ alkyl phenol (6gm) and methylcyclohexane were heated at 50°C until a clear solution was obtained. Upon cooling to 24°C the solution remained clear and free of crystals.

EXAMPLE VI

One gram of N-(octadecyl) benzene sulfonamide was slurried with 10 ml (7.4 gm) methylcyclohexane at 24°C. Upon addition of 7.6 grams of nonyl phenol a clear solution was obtained. The solution was then heated to 50°C and slowly cooled to 4°C, at which a slight cloud was noted.

EXAMPLE VII

One gram N-(octadecyl) benzene sulfonamide was slurred with 10 ml (7.4 grams) methylcyclohexane at about 24°C. Nonyl phenyl (11.4 grams) was added and a clear solution was obtained. The solution was heated to 38°C and slowly cooled. At −35°C a cloud was noted and the solution became very viscous.

grams nonyl phenol was employed to obtain the clear solution.

EXAMPLE XI

This example demonstrates the advantage of using hydrocarbon solutions of sulfonamide alkylation aids in alkylation reactions. Several alkylation runs were made wherein isobutane was alkylated with butene-2in the presence of sulfuric acid alkylation catalyst. The catalyst comprised spent acid from a commercial alkylation process refortified with fresh, concentrated $H_2SO_4$. The results of these alkylation runs are shown in Table I below. Run 1, in Table I is a base case wherein no alkylation aid was employed. Runs 2 – 6 are alkylation runs employing alkylation aids solubilized in hydrocarbon solutions by means of alkyl phenols. From Table I, it is easily seen that hydrocarbon solutions of alkylation aids are effective for improving alkylate quality and decreasing acid consumption in alkylation reactions.

TABLE I

| Run No. | 1 | 2 | 3 | 4 | 5 | 6 | 7 |
|---|---|---|---|---|---|---|---|
| $H_2SO_4$ Acidity, % | 95.7 | 95.7 | 95.7 | 95.7 | 95.7 | 94.36 | 95.1 |
| Isobutane/Butene-2 mole ratio | 6/1 | 6/1 | 6/1 | 6/1 | 6/1 | 6/1 | 6/1 |
| Reaction Temp., °C | 10 | 8.9 | 9.4 | 10.6 | 11.7 | 12.8 | 11.1 |
| Olefin Space Velocity Vol/olefin/hr/vol acid | 0.18 | 0.18 | 0.18 | 0.18 | 0.19 | 0.20 | 0.18 |
| Solution of Alkylation aid | None | Ex. I | Ex. I | Ex. II | Ex. III | Ex. IV | Ex. V |
| Solution wt. % acid catalyst basis | — | 0.14 | 0.21 | 0.16 | 0.11 | 0.16 | 0.22 |
| Spent Acid Acidity (wt. %) | 93.9 | 95.1 | 94.8 | 94.5 | 93.51 | 93.79 | 94.6 |
| Alkylate | | | | | | | |
| $C_5$ | 3.5 | 3.4 | 4.0 | 3.5 | 3.0 | 4.0 | 3.5 |
| $C_6$ | 6.4 | 6.0 | 6.6 | 5.9 | 5.5 | 6.6 | 6.4 |
| $C_7$ | 5.8 | 5.9 | 6.6 | 5.5 | 5.5 | 6.2 | 6.5 |
| $C_8$ | 60.7 | 65.0 | 69.0 | 73.1 | 66.2 | 64.9 | 69.7 |
| $C_9$+ | 24.1 | 19.6 | 14.2 | 12.0 | 19.8 | 18.3 | 13.9 |
| Trimethyl pentane % of alkylate | 44.9 | 52.9 | 57.4 | 61.1 | 53.9 | 51.5 | 56.0 |
| Motor octane(clear) | 83.6 | 86.5 | — | — | — | — | |
| 80.9 | | | | | | | |

EXAMPLE VIII

One gram N-(octadecyl) benzene sulfonamide was slurried with 20 ml (14.8 gm) methylcyclohexane at about 24°C. To the slurry, 4.5 grams of nonyl phenol were added and a clear solution was obtained. The solution was heated to 40°C and slowly cooled. At −30°C a slight cloud was noted.

EXAMPLE IX

Six grams of hexadecylamine was added to 50 grams of iso-octane and heated to about 55°C and solution of the amine was incomplete. The mixture was cooled to room temperature and nonyl phenol was slowly added with shaking. Upon addition of 8.6 grams of nonyl phenol, a clear solution was obtained at about 21°C.

EXAMPLE X

Three and one-half grams hexadecyl trimethyl ammonium bromide were added to 50 grams dry iso-octane. This mixture was a slurry at room temperature. Small portions of nonyl phenol were added until a clear solution resulted at room temperature. A total of 5.7

EXAMPLE XII

This example demonstrates the advantage of using hydrocarbon solutions of alkylamine alkylation aids in alkylation reactions. Several alkylation runs were made wherein isobutane was alkylated with an olefin blend comprising 59 weight percent butene-2 and 41 weight percent propylene in the presence of sulfuric acid alkylation catalyst. The catalyst comprised spent acid from a commercial alkylation process refortified with fresh, concentrated $H_2SO_4$. The results of these alkylation runs are shown in Table II below. Run 7 in Table II, is a base case wherein no alkylation aid was employed. Runs 8 & 9 are alkylation runs employing hexadecylamine alkylation aid solubilized in hydrocarbon solution using alkyl phenol solubilizing agents as described in Example IX above. From Table II, it is easily seen that hydrocarbon solutions of such alkylation aids are effective for improving alkylate quality acid consumption in alkylation reactions.

TABLE II

| Run No. | 7 | 8 | 9 |
|---|---|---|---|
| $H_2SO_4$ Acidity, % | 95.2 | 95.2 | 95.2 |

TABLE II-Continued

| Run No. | 7 | 8 | 9 |
|---|---|---|---|
| Isobutane/Olefin mole ratio | 5.85/1 | 5.85/1 | 5.85/1 |
| Olefin space velocity Vol olefin/hr/vol acid | 0.2 | 0.2 | 0.2 |
| Reaction Temp., °C | 10 | 10.6 | 8 |
| Solution of Alkyation Aid | None | Ex. IX | Ex. IX |
| wt. %, Basis Acid | 0 | 0.268 | 0.137 |
| wt. %, hexadecylamine basis acid | 0 | 0.025 | 0.013 |
| Spent Acid Acidity (wt. % $H_2SO_4$) | 92.3 | 93.5 | 93.5 |
| Alkylate composition | | | |
| $C_5$ | 2.6 | 2.0 | 1.5 |
| $C_6$ | 5.6 | 4.2 | 3.5 |
| $C_7$ | 13.7 | 13.4 | 10.9 |
| $C_8$ | 62.6 | 69.9 | 73.6 |
| $C_9$+ | 15.5 | 10.5 | 10.5 |
| Alkylate $C_7$ fraction (% of alkylate) | | | |
| dimethyl pentane | 13.6 | 13.3 | 8.2 |
| other $C_7$ | 0.1 | 0.1 | 0 |
| Alkylate $C_8$ fraction (% of alkylate) | | | |
| trimethyl pentane | 51.8 | 54.5 | 67.2 |
| other $C_8$ | 10.8 | 5.4 | 6.4 |

EXAMPLE XIII

In order to determine the effect of alkyl phenols upon an alkylation reaction, several alkylation runs were made wherein isobutane was alkylated with butene-2 in the presence of sulfuric acid catalyst. The catalyst comprised spent acid from a commercial alkylation process refortified with fresh $H_2SO_4$. In Run 10, the alkylation reaction was performed without any additive to serve as a base case. In Runs 11 and 12 the alkylation reactions were performed with nonyl phenol present. The results from these alkylation runs are shown in Table III below. From Table III it is seen that the presence of a small amount of nonyl phenol (run 11) resulted in a slight increase in trimethylpentane content of the alkylate product and acidity of spent acid increased. The presence of nonyl phenol and toluene in the alkylation reaction (run 12) likewise resulted in a small improvement in alkylate quality and reduced acid consumption.

TABLE III

| Run | 10 | 11 | 12 |
|---|---|---|---|
| Catalyst, wt. % $H_2SO_4$ | 95.7 | 94.4 | 94.4 |
| Isobutane/Butene-2 mole ratio | 6/1 | 6/1 | 6/1 |
| Reaction Temperature, °C | 10.00 | 13.3 | 11.1 |
| Olefin Space Velocity Vol. olefin/hr./vol. acid | 0.18 | 0.18 | 0.18 |
| Nonyl Phenol, wt. % catalyst | -0- | 0.0325 | 0.0325 |
| Toluene, wt % catalyst | -0- | -0- | 0.116 |
| Spent Acid, wt. % $H_2SO_4$ | 93.9 | 94.1 | 94.4 |
| Trimethyl Pentane Wt.% Alkylate | 44.9 | 45.4 | 46.3 |

We claim:

1. In an alkylation process wherein an isoparaffin hydrocarbon is alkylated with an olefin hydrocarbon in the liquid phase, in the presence of an alkylation catalyst comprising an acid selected from the group consisting of hydrogen fluoride, sulfuric acid, and mixtures of sulfuric acid and fluorosulfonic acid, and employing an alkylation aid selected from the group consisting of aliphatic amines having an alkyl radical of 12 to 24 carbon atoms, halogen salts of alkyl ammonium compounds having at least one alkyl radical of 12 to 20 carbon atoms, phosphonium salts having at least one aliphatic radical of 12 to 20 carbon atoms, sulfonium salts having at least one aliphatic radical of 12 to 20 carbon atoms, and compounds having the formula:

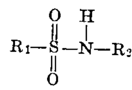

wherein $R_1$ is selected from alkyl, aromatic, and alkyl aromatic radicals, and wherein $R_2$ is alkyl of from 8 to 30 carbon atoms;

The improvement which comprises:

a. mixing said alkylation aid with an alkyl phenol solubilizing agent selected from the group consisting of mono- and di-nuclear aromatics having at least one phenolic hydroxyl group and at least one aliphatic side chain of from 6–50 carbon atoms, and with hydrocarbon solvent boiling in the range of from 25°C to about 220°C, forming a clear solution comprising about 5 to 15 weight percent alkylation aid, about 5 to 50 weight percent alkyl phenol and about 40 to 90 weight percent hydrocarbon solvent; and b. employing, in the alkylation process, from about 0.0033 weight percent to about 20 weight percent, based on acid catalyst, of said solution.

2. The process of claim 1 wherein the alkyl phenol solubilizing agent is a mononuclear, monohydroxy phenol having a single alkyl side chain of from 6 to 15 carbon atoms, and wherein the hydrocarbon solvent is selected from the group consisting of cycloalkanes, alkyl substituted cycloalkanes, polycycloalkanes, paraffins, aromatics, and mixtures thereof having from about 6 to about 10 carbon atoms per molecule.

3. The process of claim 2 wherein the hydrocarbon solvent is selected from the group consisting of cyclohexane, methylcyclohexane, decalin, paraffins of from 6 to 10 carbon atoms, toluene and benzene.

4. The process of claim 3 wherein the alkylation aid is a sulfonamide compound of the formula:

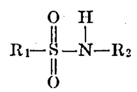

wherein $R_1$ is selected from alkyl, aromatic, and alkyl aromatic, and wherein $R_2$ is alkyl of from 8 to 30 carbon atoms.

5. The process of claim 3 wherein the alkylation aid is selected from the group consisting of N-(octadecyl) benzene sulfonamide, N-(octadecyl) toluene sulfonamide, and N-(octadecyl) methane sulfonamide.

6. The process of claim 5 wherein the liquid strong acid catalyst is hydrofluoric acid.

7. The process of claim 5 wherein the liquid strong acid catalyst is sulfuric acid.

* * * * *